United States Patent
Gilliam

(10) Patent No.: US 11,078,340 B2
(45) Date of Patent: Aug. 3, 2021

(54) COATED FIBERS, METHODS OF MAKING, AND COMPOSITE MATERIALS REINFORCED WITH COATED FIBERS

(71) Applicant: Kettering University, Flint, MI (US)

(72) Inventor: Mary Gilliam, Brighton, MI (US)

(73) Assignee: Kettering University, Flint, MI (US)

( * ) Notice: Subject to any disclaimer, the term of this patent is extended or adjusted under 35 U.S.C. 154(b) by 12 days.

(21) Appl. No.: 15/172,421

(22) Filed: Jun. 3, 2016

(65) Prior Publication Data

US 2016/0355646 A1 Dec. 8, 2016

Related U.S. Application Data

(60) Provisional application No. 62/170,293, filed on Jun. 3, 2015.

(51) Int. Cl.
| | |
|---|---|
| *C08J 5/06* | (2006.01) |
| *D06M 15/643* | (2006.01) |
| *D06M 13/513* | (2006.01) |
| *D06M 10/02* | (2006.01) |
| *D06M 14/22* | (2006.01) |
| *D06M 14/36* | (2006.01) |
| *D06M 10/08* | (2006.01) |
| *D06M 101/06* | (2006.01) |
| *D06M 101/40* | (2006.01) |

(52) U.S. Cl.
CPC ............ *C08J 5/06* (2013.01); *D06M 10/025* (2013.01); *D06M 10/08* (2013.01); *D06M 13/513* (2013.01); *D06M 13/5135* (2013.01); *D06M 14/22* (2013.01); *D06M 14/36* (2013.01); *D06M 15/643* (2013.01); *C08J 2323/12* (2013.01); *C08J 2401/02* (2013.01); *D06M 2101/06* (2013.01); *D06M 2101/40* (2013.01); *D06M 2200/12* (2013.01); *D06M 2400/01* (2013.01); *D10B 2401/021* (2013.01)

(58) Field of Classification Search
CPC ........... C08J 7/123; C08J 7/18; D06M 10/025
See application file for complete search history.

(56) References Cited

U.S. PATENT DOCUMENTS

| | | | | |
|---|---|---|---|---|
| 4,303,696 A | * | 12/1981 | Brack | C08F 283/04 427/503 |
| 4,919,856 A | * | 4/1990 | Anazawa | B01D 67/0025 264/129 |
| 4,983,814 A | * | 1/1991 | Ohgushi | D02G 3/441 219/212 |
| 5,498,763 A | | 3/1996 | McGarry et al. | |
| 6,051,314 A | | 4/2000 | Girgis | |
| 6,087,000 A | | 6/2000 | Girgis et al. | |
| 6,849,303 B2 | | 2/2005 | Dave | |
| 8,278,365 B2 | | 10/2012 | Murdock et al. | |
| 2010/0035119 A1 | * | 2/2010 | Wagner | B01D 39/1623 429/490 |
| 2013/0001204 A1 | * | 1/2013 | Mistry | H01H 1/24 219/121.59 |
| 2013/0167461 A1 | * | 7/2013 | Brabbs | B05D 3/046 52/309.1 |

FOREIGN PATENT DOCUMENTS

| | | | | |
|---|---|---|---|---|
| JP | H06093568 A | * | 4/1994 | |
| JP | 2006225191 A | * | 8/2006 | ........... C03B 37/027 |
| WO | WO-2014004359 A1 | * | 1/2014 | ................ C08J 5/06 |

OTHER PUBLICATIONS

Machine translation of JP-2006225191-A, 2006. (Year: 2006).*
The Mechanism and kinetics of plasma polymerization Plasma Chemistry III pp. 43-68 (Year: 2006).*
Studies of the Mechanism and Kinetics of Plasma-Initiated Polymerization of Methyl Methacrylate, D. Johnson et al, Macromolecules 1981, 14, 118-124 (Year: 1981).*
Machine translation of JPH06093568A. (Year: 1994).*
Application of plasma technology in textiles, Md. Mazharul Islam Kiron, https://textilelearner.blogspot.com/2012/04/application-of-plasma-technology-in.html (Year: 2013).*

* cited by examiner

Primary Examiner — Wenwen Cai
(74) Attorney, Agent, or Firm — Dickinson Wright PLLC

(57) ABSTRACT

In general, coated fibers, methods of bonding a coating to fibers, and composite materials prepared from coated fibers are provided. The coated fiber is created with a surface that is compatible with and bonds to the polymer resin used in composite materials. In another aspect, the coating may exhibit additional functionality, such as water repellency, fire resistance, or odor control. More specifically an atmospheric pressure plasma process is applied to the fibers to bond coating materials to the fiber surface and to cure the coating surrounding the fiber surface. Optionally, radiation is used in the process to cure the coating. Finally, composite materials and parts may be made from the coated fibers that exhibit high strength and improved mechanical properties over composites made with uncoated fibers. Alternatively, a natural fiber reinforced composite material is made from coated natural fibers that has improved mechanical properties and decreased water absorption.

10 Claims, 5 Drawing Sheets

COATED FIBERS, METHODS OF MAKING, AND COMPOSITE MATERIALS REINFORCED WITH COATED FIBERS

CROSS-REFERENCE TO RELATED APPLICATIONS

This application claims priority to U.S. Provisional Patent Application No. 62/170,293 filed on Jun. 3, 2015, which is incorporated herein in its entirety by reference.

FIELD

This disclosure generally relates to a method of bonding a coating to fibers, the coated fibers formed therefrom, and composites subsequently formed that incorporate the coated fibers. More specifically, this disclosure relates to an atmospheric pressure plasma process applied to the fibers in order to bond coating materials to the fiber surface and to cure the coating surrounding the fiber surface.

BACKGROUND

The statements in this section merely provide background information related to the present disclosure and may not constitute prior art.

A large portion of the waste in landfills in the United States is from non-renewable materials. Furthermore, the production of non-renewable materials is resource intensive and impacts the air quality, water, and climate change. The building and construction industry has been increasingly adopting green building practices, citing reduced energy consumption, lower greenhouse gas emissions, protection of natural resources, reduced water consumption, and improved indoor air quality as reasons to utilize greener technologies. As builders, architects, and engineers continue to accelerate the use of green technologies, innovative new materials are needed to fill this demand.

Composite materials are lighter weight than most conventional materials, have a high strength-to-weight ratio, and conserve energy due to thermal insulation. However, composites made of glass or carbon fiber are non-renewable sources that consume significant resources during production. Life cycle analyses of natural fiber reinforced (NFR) composites compared to glass fiber composites show that NFRs are environmentally superior with respect to energy consumption and greenhouse gas emissions. NFRs also require higher fiber content and lower amount of the more polluting base polymer. Furthermore, the lower weight of NFRs improves fuel economy during transport of the materials and when used in transportation applications.

The market for composite materials made with natural fibers is growing fast in applications with less restrictive requirements for strength and durability, such as indoor or interior components, especially in automotive and building and construction industries. An increased use of NFRs to replace traditional building materials and would bring about significant positive environmental benefits. These factors ultimately impact climate change and landfill waste. The surge in demand for LEED-certified buildings has significantly increased the demand for building products made with rapidly renewable and/or recycled materials.

Mechanical properties of natural fiber reinforced (NFR) composites are typically lower due to poor surface bonding to the resin. In addition, water absorption is increased, which causes the composite to swell and gain weight. These two key challenges inhibit expansion of NFR into applications requiring strength and durability, in addition to the lower weight and volume, reduced toxicity, and better environmental performance that is inherent to NFRs.

Several approaches that can be used to overcome these challenges include surface treatments and coatings, which can generally fall under three categories: (1) traditional chemical methods (2) plasma methods, and (3) biological and other techniques.

Traditional chemical treatments include alkali treatment, acetylation, benzoylation, silylation, graft copolymerization, addition of binding and coupling agents, and more. Grafting synthetic polymers onto the fiber surface has shown to bring about the most improved performance. In U.S. Pat. No. 5,498,763, a composite material with coated fibers in a polyester matrix is described, in which a block copolymer having an elastomer block and an ester block is grafted to the fiber surface. U.S. Pat. No. 6,051,314 describes polymer coating systems with a halogenated vinyl polymer and an elastomeric polymer on a fibers for composite materials. U.S. Pat. No. 6,087,000 provides fibers coated with fluorine-containing polymers. These chemical methods, however, typically involve several steps, long treatment times, significant waste, and solvent handling. The negative environmental impacts of traditional chemical treatments negate the benefits of composites.

Plasma processes, which have been applied for surface modification and Plasma Enhanced Chemical Vapor Deposition (PECVD) onto natural fibers, are often cited as an environmentally friendly alternative to traditional chemical treatments. Conventional plasma consists of vacuum processing, which cannot be operated fully continuously and is energy and capital intensive. Atmospheric pressure plasmas offer benefits in environmental impact, manufacturing, and cost over low pressure plasmas. Both low pressure and atmospheric plasmas have been used to increase water repellency of textile fibers. While these reports show increased hydrophobicity, drawbacks to application in NFRs are as follows: techniques to apply diamond like carbon (DLC) use vacuum processing; fluorocarbons were used in some cases, which produces potentially dangerous emissions during processing; and PECVD of siloxanes was performed in other cases, which produces a highly cross-linked, inflexible $SiO_2$ surface.

U.S. Pat. No. 8,278,365 describes composites made from carpet waste fibers of any natural and synthetic type. The material includes a binding agent for the structural integrity of the material, without a method of chemically bonding the coating.

U.S. Pat. No. 6,849,303 provides a method for electrostatically coating fiber substrates. The method requires an electrostatic coater, a furnace, a powder collector for powder that is sprayed but does not coat the fibers, and a fire detection device to account for the dust explosion hazard. Furthermore, a significant amount of powder waste is produced in the process.

The surface treatment approaches reported have significant limitations and there is a need to solve the problem in such a way that provides a cost-effective, scalable, and safe process that has a minimal environmental impact, as well as a method for bonding natural fibers to polymer resin material and preventing water absorption. The solution provided in this disclosure achieves the following benefits: adhesion of the fiber to the resin, increased mechanical properties of the composite, capability to add functions to the composite, such as water repellency to minimize swelling, fire resistance, and odor control, as well as a process that is fast, scalable, cost-effective, and has a minimal environmental impact.

This disclosure describes coated fibers and methods and materials that overcome the technical challenges with a process that has minimal environmental impact. The disclosure also provides a natural fiber composite material that overcomes the challenges of natural fiber composites with improved performance and minimal water absorption. The improved performance of the coated natural fiber composites enables use of renewable and bio-based materials in new applications. This disclosure also describes various physical forms of the coated fibers, as well as composite materials and parts made with the coated fibers.

SUMMARY

In order to improve the performance of composite materials and parts, the present disclosure generally provides coated fibers for use as a reinforcement material that bonds with the composite resin matrix and improves the mechanical properties of the composite materials. The methods of making the coated fibers include atmospheric pressure plasma for bonding the coating precursor to the fiber surfaces and to cure the coating. A coating formulation is applied to the surface of the fibers prior to exposure to atmospheric plasma. The coating formulation can comprise, consist essentially of, or consist of a pure chemical, a mixture, a solution, and dispersion. Another aspect includes radiation curing in combination with plasma processing and placed before, during, or after plasma exposure. Yet another aspect includes radiation as the only cure mechanism for the coating.

The fibers are fed continuously through the coating process in any form of continuous fibers, short fibers, woven mats, or any other physical form. In one aspect, the fiber surfaces are treated with atmospheric pressure plasma prior to application of the coating formulation to enhance bonding of the coating to the fiber surface. The coating formulation is applied to the fiber surface by dipping, flowing, spraying, or by other means known by someone skilled in the art. In one aspect, the fiber is exposed to atmospheric plasma after the coating application. In another aspect, the fibers are exposed to radiation for curing after the coating application. In yet another aspect, the steps of applying a coating formulation and exposing the surface are conducted multiple times to produce multilayer coatings.

The coated fibers can be used as reinforcement material for composite materials. The coated fibers can be woven into fabrics, chopped into short fibers, or pressed into mats prior to making the composites. In one aspect, the coated fibers are woven with uncoated fibers, such as thermoplastic fibers, to create a fabric of comingled coated fibers and uncoated fibers. The coated fiber fabrics can be pre-impregnated with a resin system prior to undergoing the composite fabrication process. The composites can be made from any method known in the art using thermoset or thermoplastic materials. When desirable, the composites may exhibit a constant or uniform cross-section.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
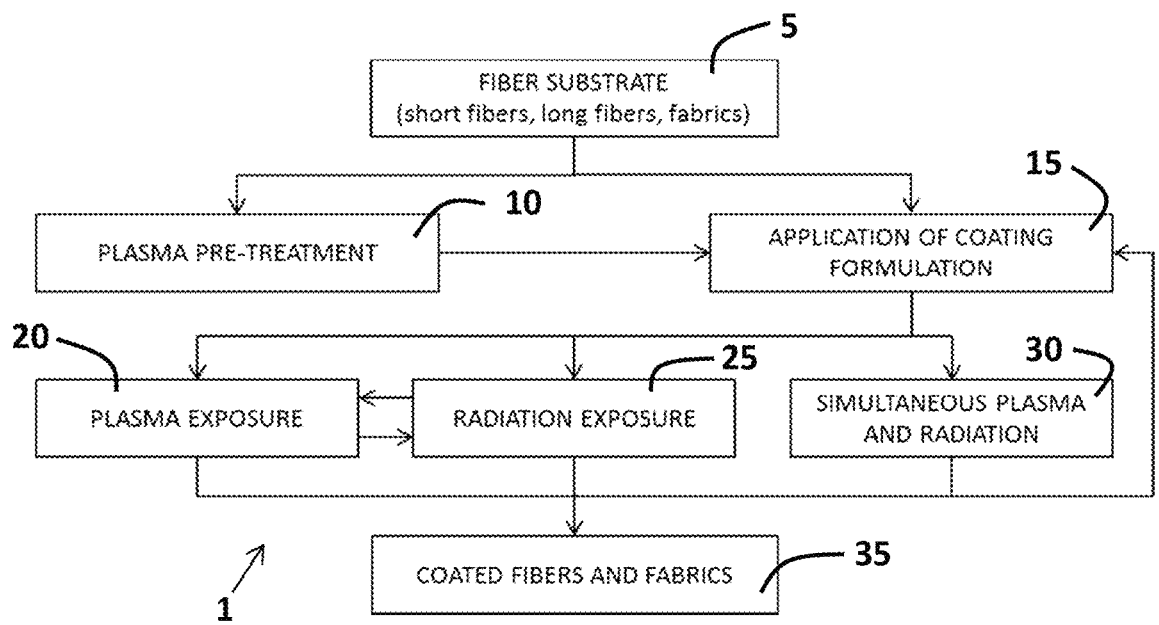
FIG. 1 is a schematic representation of the possible pathways involved in the methods of making the coated fibers according to the teachings of the present disclosure.

The following description is merely exemplary in nature and is in no way intended to limit the present disclosure or its application or uses. It should be understood that throughout the description, corresponding reference numerals indicate like or corresponding parts and features.

The present disclosure relates to coated fibers, methods of making coated fibers, and composite materials created with the coated fibers as reinforcement. The coated fibers are any in the form of a fiber, thread, strand, yarn, or filament of any size and length and from any source and material and blends of materials. Plant sources of fibers are numerous and can include flax, wood, jute, kenaf, hemp, cotton, coir, bamboo, abaca, ramie, sisal, and more. Animal sources of fibers include silk, wool, camel hair, angora, alpaca, and mohair. Synthetic materials for fibers include glass, carbon, and plastics. Fibers can be blends of any of the sources and materials above.

Referring to FIG. 1, possible pathways involved in the method 1 of making the coated fibers according to the teachings of the present disclosure are described. The substrate can be short fibers, long fiber strands, and woven fiber fabrics 5. In one aspect, the substrate is exposed to atmospheric plasma pre-treatment for surface activation 10 prior to application of the coating formulation. The coating formulation is applied to the substrate 15. After application of the coating formulation, the substrate undergoes exposure for bonding and curing the coating to the fibers. The types of exposure include atmospheric plasma 20, radiation 25, and simultaneous plasma and radiation 30. Alternatively, bonding the coating formulation to the surface of the fiber is done using atmospheric plasma. After exposure, the fibers may undergo another exposure or application of the coating formulation again followed by another exposure, or the fibers may be collected as coated fibers 35.

The methods of making the coated fibers include low temperature atmospheric plasma of any type. The type of plasma source can include corona, dielectric barrier discharge, microwave, atmospheric plasma jets, hollow cathode, and others. The plasma sources can be powered by a generator that is continuous direct current (DC), pulsed DC, or alternating current in any frequency, such as ranging from Radio Frequency (RF) to microwave frequency.

The source gas for the atmospheric plasma is any that can generate a plasma discharge. In one aspect, the source gas for plasma can include any single gas or a combination of gases that do not form a solid film, such as air, nitrogen, helium, argon, oxygen, hydrogen, carbon dioxide, and nitrous oxide. In another aspect, the source gas can include the addition of a chemical precursor or mixture of precursors that can form a solid film. The precursor may comprise any organic, inorganic, organosilicon, and metal oxide. The additional precursor can be used as the source gas to generate the plasma or injected into the plasma source or into the plasma discharge downstream of the plasma source.

In another aspect, the methods of making the coated fibers include exposure to radiation. The radiation can be in the form of an electron beam or ultraviolet (UV) radiation. The source of the radiation can include an electron beam gun, mercury lamps, xenon lamps, hybrid xenon/mercury lamps, and eximer lamps.

The fibers are fed continuously through the coating process. The fibers can be fed as long, continuous fibers that can be collected by a means such as winding around a spool. Short fibers can be fed through the process continuously in any means available, such as a conveyor system or gravitational feed.

The methods of coating include application of the coating formulation and exposure to plasma, radiation, or a combination of plasma and radiation. The coating formulation can be comprised of a pure chemical, a mixture, a solution, and a dispersion. The coating formulation comprises, consists essentially of, or consists of substances that when exposed to plasma, radiation, or a combination of plasma and radiation produce a coating that is compatible with the composite thermoset or thermoplastic resin and create strong interfacial bonding. The formulation can be designed to react with the resin to form covalent bonds, to enhance intermolecular bonding between the coating and the resin, to possess a similar surface energy as the resin, and/or to enable inter-diffusion of molecules across the interface of the coated fiber and the resin. In another aspect, the formulation is designed to provide a water barrier from the fiber. In yet another aspect, the formulation contains substances with specific functional properties, such as fire resistance and odor control.

The possible chemicals that may be incorporated into the coating formulation are numerous and can be, without limitation, any natural, synthetic, organic, inorganic, organosilicon, and/or biological substance. The plasma discharge contains highly energetic species that can bring about fragmentation of monomers and precursor chemicals that are exposed to the discharge. Unlike conventional polymerization, monomer molecules used in plasma do not require special functional groups. The formulation can include organic substances, including organic monomers, oligomers, and polymers. The organic substances can include those that are similar to the resin, such as those with similar chemical functional groups that can include epoxy, amine, ester, styrene, vinyl, isocyanate, acrylate, and many more. The formulation can also include natural oils, such as linseed oil, cottonseed oil, soybean oil, sunflower oil, tall oil fatty acids, safflower oil, and castor oil. Petroleum derived oils and oligomers can also be used in the formulation. Polymers and oligomers, in solution or pure, can be used in the formulation and grafted onto the fiber surface. Polymers with chemical functional groups that can react with the surface of the fiber can also be used, such as maleic anhydride grafted polypropylene (MAPP). Coupling and binding agents can be added to the formulation, such as maleated agents, isocyanates, and formaldehydes.

Silane coupling agents and organosilicon compounds can be added to the coating formulation. Silanes can include one or more from the following functional groups: alkoxy silane, acryloxy silane, aminosilane in which the molecule contains $NH$ or $NH_2$ group(s), cyclic azasilane, sulfonylazide, epoxy, isocyanate, long chain alkylsilane, methacryloxy silane, and multipodal silanes. The silane and organosilicon agents can contain an organic group that can possess a targeted functionality such as chemical similarity or reactivity with the polymer resin or another compound added to the composite material. The coating formulation can also include organosilicon compounds comprised of longer chain oligomers and polymers. Specific examples of suitable organosilicon compounds to use in the coating formulation include, but are not limited to, decamethylcyclopentasiloxane, octamethylcyclotetrasiloxane, hexamethyl-disiloxane, hexamethyldisilazane, octamethylcyclotetrasilazane, 3-acryloxypropyl-trimethoxysilane, n-2-aminoethyl-3-aminopropyltrimethoxysilane, 3-trimethoxysilyl-propyldiethylenetriamine, 3-am inopropyltrimethoxysilane, n-methyl-aza-2,2,4-trimethylsilacycyclopentane, bistrimethoxysilylethylbenzene, 3-isocyanatopropyl-triethoxysilane, n-octadecyltrimethoxysilane, methacryloxypropyltrimethoxysilane, triethoxysilyl-modified poly-1,2-butadiene, 3-thiocyanatopropyltriethoxysilane, 6-azido-sulfonylhexyltriethoxysilane, 2-hydroxy-4-3-triethoxysilylpropoxydiphenylketone, vinyltriethoxysilane, vinyltrimethoxysilane, vinyltris-2-methoxyethoxysilane, and vinylethoxysiloxane homopolymer.

When radiation curing is involved, monomers that are polymerizable under radiation are added to the formulation. The list of commercially available substances that are suitable for radiation curing is numerous. Chemistries for radiation polymerization can include systems that comprise, consist essentially of, or consist of polyesters, styrenes, polyene/thiols, numerous types of acrylates, urethanes, and epoxy. Photoinitiators can be added to the formulation when radiation is involved. Commercially available photoinitiators are numerous and can include free radical and/or cationic photointiators. Synergist compounds can be added with the photoinitiators, including, without limitation, those with tertiary amines, amides, ureas, and any carbon atom with a hydrogen atom in the alpha position to a nitrogen atom.

The coating formulation can include any solvent or mixture of solvents, acids, as well as oxidizers such as peroxides and halogen compounds. The coating formulation can also include any additives or chemical to impart specific properties and functions to the coating. Specific functional properties can include, but not limited to, water barrier properties, fire resistance, odor control, slip and abrasion resistance, and/or weathering.

The method of coating includes application of the coating formulation to the fiber surface by any means available, such as dipping, flowing, or spraying, for example. The fiber with the coating formulation on the surface is exposed to atmospheric plasma for grafting and curing. In one aspect, the fiber surface is exposed to atmospheric plasma prior to application of the coating formulation to activate the surface and enable stronger bonding with the coating. Surface treatment can produce surface active sites, including hydroxyl groups and free radicals, which can react with substances in the coating formulation and graft them to the surface. In another aspect, the fiber with the coating formulation is exposed to radiation before, after, or during exposure to atmospheric plasma. In another aspect, radiation is the only cure mechanism used in the process. In another aspect, application of the coating formulation and exposure to plasma, radiation, or a combination of plasma and radiation are performed simultaneously. In yet another aspect, the coated fiber may undergo any steps in the coating process more than once and in any order to produce multiple coating layers.

The coated fibers can be spooled, chopped into short fibers, or collected as loose fibers and comprise, consist essentially of, or consist of a base fiber substrate and a coating that is chemically bonded to the fiber surface. In another aspect, the coating may include components that provide additional functionality, such as fire resistance, water repellency, and/or odor control, to name a few. The coated fibers can be spun into fabrics of any pattern, weave, and direction or pressed together into a mat to be used as reinforcement material for composites. In another aspect, a plurality of fibers are woven or pressed into a mat or fabric prior to undergoing the coating process and the substrate that is coated is in the form of a fabric or mat of fibers.

The coated fibers in any form of long fibers, short fibers, woven fibers, and mats of fibers are used as reinforcement material for composite materials and parts. The coated fibers can be compounded with polymer resin and processed into forms using any known processing method. For example, the coated fiber composites can be, without limitation, embedded or compounded into pellets, extruded into sheets, or molded into parts. Specific processes used to create composite materials and parts include, but are not limited to, extrusion, pultrusion, layup, resin infusion, compression, injection, filament winding, tube rolling, centrifugal casting, and more. When desirable, the composites may exhibit a constant or uniform cross-section.

The following specific examples are given to illustrate the surface treated fibers of the present disclosure, as well as the composites formed therefrom and methods of preparing the same, and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

Example 1

This example describes a coated natural fiber with a hydrophobic surface to enhance compatibility with the resin matrix and provide a water barrier to prevent swelling from water absorption. The base fiber is a 100% cellulose spun fiber supplied as BioMid™ fiber by Gordon Shank Consulting LLC (Burnaby, British Colombia, Canada) and ENC International (Seoul, South Korea). An atmospheric pressure plasma jet was supplied by Thierry Corporation (Stuttgart, Germany), PlasmaBeam model, with nitrogen as the source gas. Materials used for coating included decamethylcyclopentasiloxane (D5) supplied by Gelest, Inc. (Morrisville, Pa.), silicone powder KSP-100 supplied by Shin Etsu Chemical Company (Tokyo, Japan), and Kiwi® Camp Dry silicone formula supplied by SC Johnson (Racine, Wis.).

The base fibers were fed continuously through the plasma discharge prior to application of the coating formulation by flowing. The fibers with the coating formulations were exposed to the plasma for curing. The fibers underwent the steps of coating application and plasma exposure twice. The plasma treated samples (R-3, R-5) were compared to untreated samples (R-1), as well as samples (R-2, R-4) that were coated with the coating formulation precursor without exposing to plasma.

The fiber samples were tested for wettability by placing the sample vertically above a vessel with water and yellow dye with one end immersed for 15 minutes and measuring the distance that the water traveled. After initial wettability test results were obtained, the samples were washed in a 5% soap solution in an ultrasonic bath for 30 minutes, rinsed thoroughly, then dried and retested. A lower value for distance indicates greater hydrophobicity, which is desired. Table 1 compares the results obtained for the tested samples.

The wettable length of the untreated fibers (R-1) and the coated fibers that were not exposed to plasma (R-2, R-4) increased after washing, indicating that a weakly bonded coating or sizing was present on the fibers after production. The coated fibers (R-3, R-5) that were prepared using atmospheric plasma produced a surface on the fibers that was unwettable. After washing, however, the D5 and plasma coated sample (R-3) was slightly wettable with a wettable length of 10 mm, although not at the level of the untreated (R-1) at 101 mm or the coated fiber (R-2) that was not exposed to plasma at 75 mm. The addition of 10% KSP-100 to the D5 with plasma exposure (R-5) produced a coating that was unwettable and was not removed during washing. The results show that coating with the plasma (R-3, R-5) produced a hydrophobic surface on the fibers that was not removed during washing, indicating a strong bond. Furthermore, the addition of the hydrophobic silicone powder created a water barrier coating (R-5) that remained present after washing the coated fibers.

TABLE 1

Comparison of Wettable Lengths of Untreated and Treated BioMid ™ Fibers.

| sample | | initial wettable length (mm) | wettable length after washing (mm) |
|---|---|---|---|
| R-1 | untreated | 74 | 101 |
| R-2 | D5 without plasma | 69 | 75 |
| R-3 | D5 with $N_2$ plasma | 0 | 10 |
| R-4 | 10% KSP-100 in D5 without plasma | 74 | 122 |
| R-5 | 10% KSP-100 in D5 with $N_2$ plasma | 0 | 0 |

Example 2

This example describes natural fiber coated using the atmospheric pressure plasma process described in this disclosure. The base fiber is a 100% cellulose spun fiber supplied as BioMid™ fiber by Gordon Shank Consulting LLC (Burnaby, British Colombia, Canada) and ENC International (Seoul, South Korea). An atmospheric pressure plasma jet was supplied by Thierry Corporation (Stuttgart, Germany), PlasmaBeam model, with nitrogen as the source gas. Materials used for coating included vinyltriethoxysilane (VTES) supplied by Shin Etsu Chemical Company (Tokyo, Japan), and epoxy resin, System 2000 supplied by Fibre Glast.

Samples were generated using plasma exposure only, plasma exposure followed by application of VTES and/or epoxy, a second plasma exposure, and two plasma/coating/plasma sequences as further described in Table 2, wherein an (x) indicates that a process step was utilized.

The fiber samples were tested for wettability by placing the sample vertically above a vessel with water and yellow dye with one end immersed for 15 minutes and measuring the distance that the water traveled. A lower value for distance indicates greater hydrophobicity, which is desired. The fiber samples were also tested using X-Ray Photoelectron Spectroscopy (XPS) to evaluate surface chemical changes. The data measured for each sample is provided below in Table 2.

TABLE 2

Comparison of Surface Chemical Composition and Wettable Lengths of Untreated and Treated BioMid ™ Fibers

| SAMPLE PREP | | | | | XPS DATA | | | WETTABILITY DATA wettable length |
|---|---|---|---|---|---|---|---|---|
| plasma | VTES | plasma | epoxy | plasma | C % | O % | Si % | avg (mm) |
| UNTREATED FIBER | | | | | 80.3 | 19.7 | 0.0 | 80 |
| x | | | | | 76.3 | 23.7 | 0.0 | 77 |
| x | | | x | x | 78.4 | 21.6 | 0.0 | 56 |
| x | x | | | | 62.4 | 28.9 | 8.7 | 71 |
| x | x | x | | | 64.4 | 26.7 | 8.8 | 59 |
| x | x | x | x | | 74.1 | 24.2 | 1.5 | 34 |
| x | x | | x | | 69.9 | 25.5 | 4.6 | 30 |
| x | x | x | x | x | 61.6 | 29.0 | 9.4 | 46 |

The coated fibers that were made using atmospheric plasma comprised of, consisted essentially of, or consisted of a lower amount of surface carbon and higher amount of oxygen as compared to the untreated fiber. In the cases where VTES is used, silicon was also observed on or near the surface. The wettable lengths of the treated fibers were lower than the untreated fibers. The results show that coatings with the plasma modified the surface chemistry and the surface properties, demonstrating the capability of the process to tailor the surfaces of the fibers for desired outcomes.

Example 3

This example describes a coated natural fiber with an organosilicon material and a composite material made with coated natural fibers. The base fibers include a 100% cellulose spun fiber supplied as BioMid™ fiber by Gordon Shank Consulting LLC (Burnaby, British Colombia, Canada) and ENC International (Seoul, South Korea). An atmospheric pressure plasma jet was supplied by Thierry Corporation (Stuttgart, Germany), PlasmaBeam model, with argon and nitrogen as the source gases. The material used for coating included vinyltriethoxysilane (VTES) and polypropylene was used for the composite material.

Figure 2:
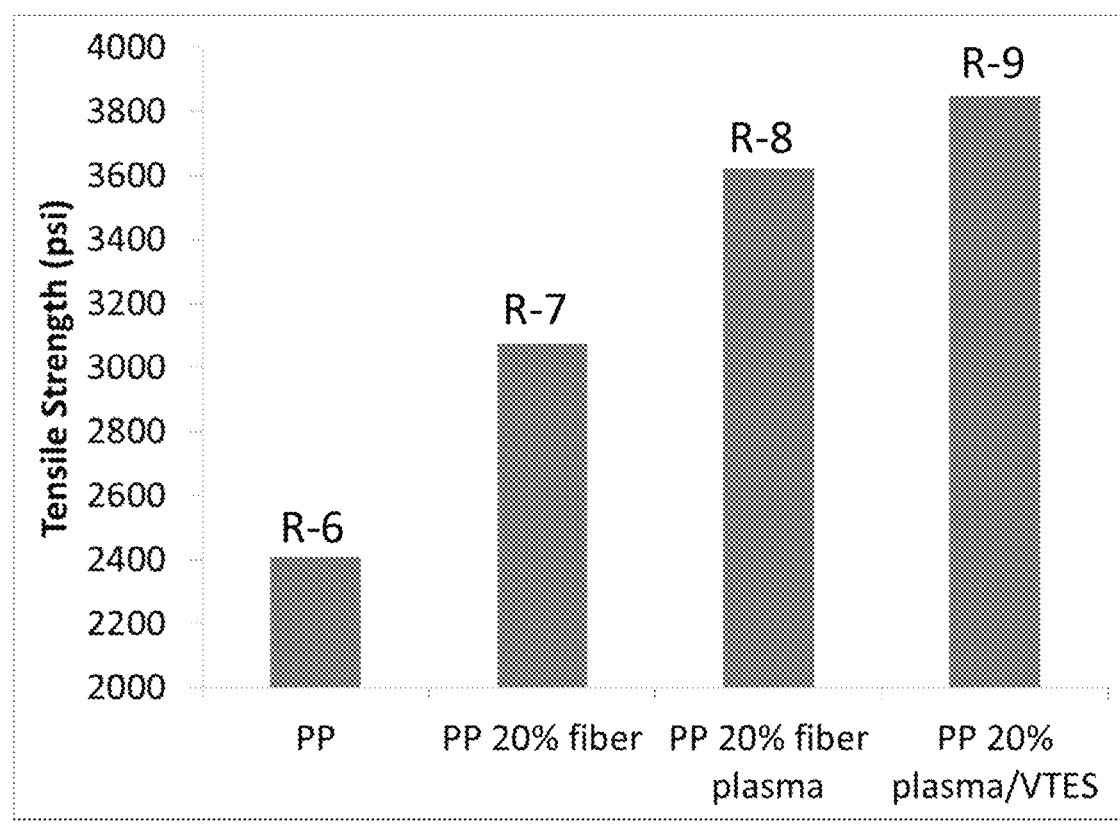
FIG. 2 is a graphical representation of the tensile strength measured for 20% fiber reinforced polypropylene composites in which the fibers are subjected to different surface treatments.

Composite test parts were prepared by chopping the fibers into 5 mm length after coating. The chopped fibers were added to polypropylene pellets to form a composite with a fiber content of 20% by mass. The fiber and polypropylene mixture was compounded by melting into a flat plate and then pelletized. The composite pellets were injected molded into tensile bar test parts for mechanical property testing. Referring now to FIG. 2, a comparison of the tensile strength measured for composites comprising only the polypropylene (PP, R-6) with no fibers, polypropylene with 20% fiber that was untreated (PP 20% fiber, R-7), polypropylene with fibers treated with plasma (PP 20% fiber plasma, R-8), and polypropylene with fibers treated with plasma followed by application of VTES (PP 20% fiber plasma/VTES, R-9). The comparison shows that the tensile strength of the plasma processed composite materials (R-8, R-9) compared to the non-reinforced polypropylene (R-6) was 50% greater for the plasma treatment alone (R-8) and 61% greater for the plasma treatment followed by VTES coating (R-9). Compared to the untreated fiber reinforced polypropylene (R-7), the tensile strength was 18% greater for the plasma treatment alone (R-8) and 25% greater for the plasma treatment followed by VTES coating (R-9).

Example 4

This example describes a coated natural fiber with an organosilicon material. The base fibers include a 100% cellulose spun fiber supplied as BioMid™ fiber by Gordon Shank Consulting LLC (Burnaby, British Colombia, Canada) and ENC International (Seoul, South Korea). An atmospheric pressure plasma jet was supplied by Thierry Corporation (Stuttgart, Germany), PlasmaBeam model, with nitrogen as the source gases. The material used for coating included vinyltriethoxysilane (VTES).

Figure 3:
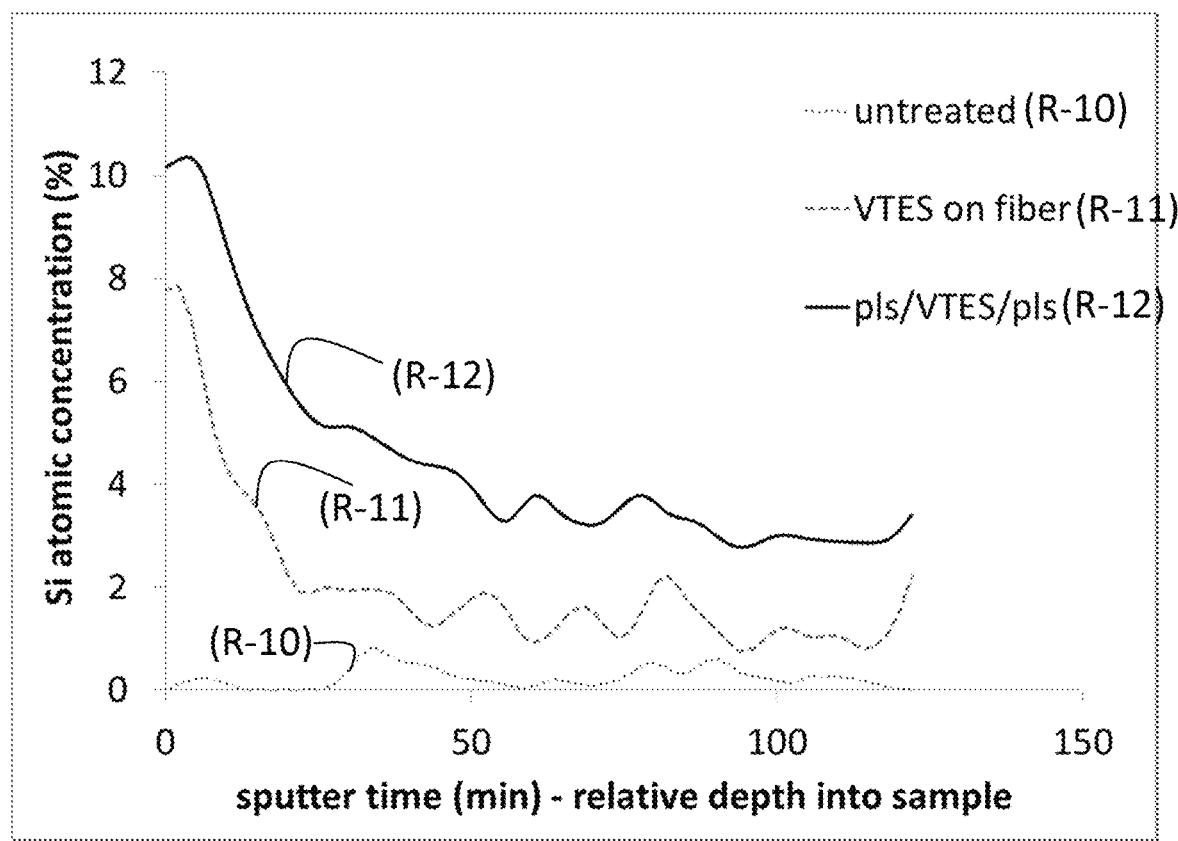
FIG. 3 is a graphical representation of silicon concentration plotted as a function of depth profiling into the surface of treated and untreated fibers.

The fiber surfaces were tested using X-Ray Photoelectron Spectroscopy (XPS) to observe the surface chemical content. The samples tested included untreated fiber (R-10), fiber with VTES applied without plasma (R-11), and fiber treated with nitrogen plasma followed by VTES and plasma post-exposure (R-12). The XPS testing included depth profile scans to observe the surface silicon content, as well as the relative thickness of the coating. Referring now to FIG. 3, a graph comparing the depth profiles measured for the fiber samples (R-10 to R-12) is provided. The depth profile shows that the surface content of silicon and thickness of the surface layer is greatest for the plasma treated fiber (R-12).

Example 5

This example describes a coated natural fiber and coated carbon fiber with an organosilicon material. The base fibers include either a 100% cellulose spun fiber supplied as BioMid™ fiber by Gordon Shank Consulting LLC (Burnaby, British Colombia, Canada) and ENC International (Seoul, South Korea) or a carbon fiber. An atmospheric pressure plasma jet was supplied by Thierry Corporation (Stuttgart, Germany), PlasmaBeam model, with nitrogen and air as the source gases. The material used for coating included vinyltriethoxysilane (VTES) and 1,6-bis(trimethoxysilyl)hexane (BTMSH) by Gelest, Inc. (Morrisville, Pa.).

Figure 4:
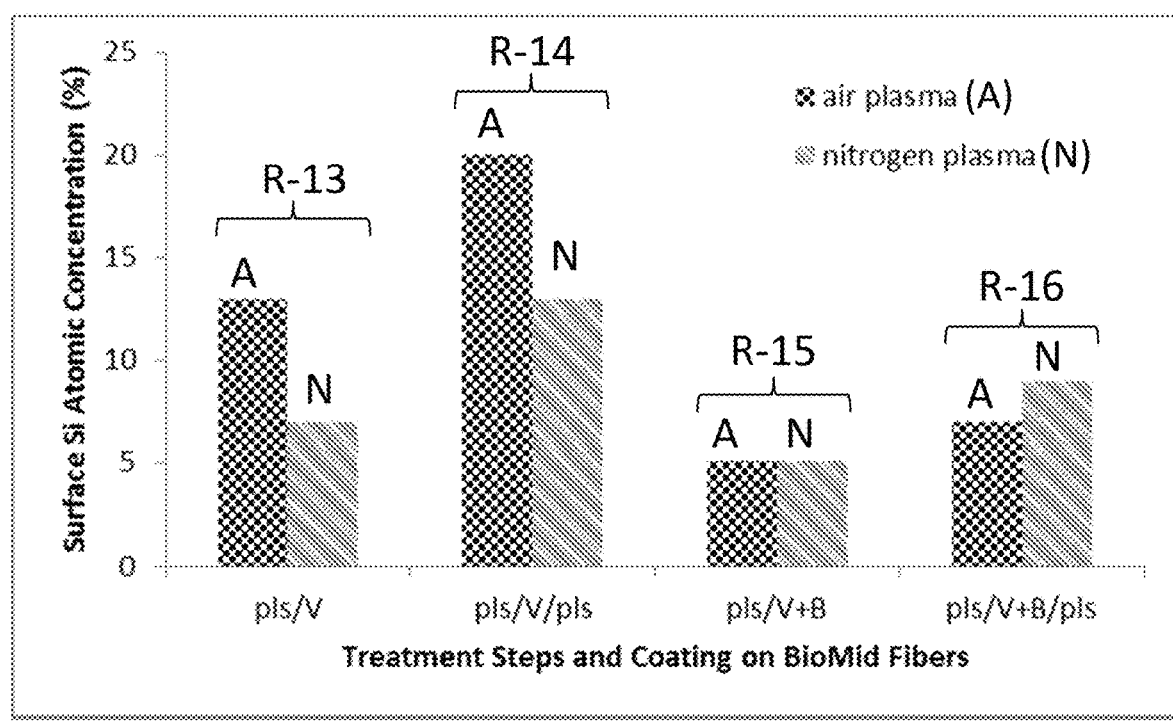
FIG. 4 is a graphical representation of the surface silicon content measured for treated cellulose-based fibers.
Figure 5:
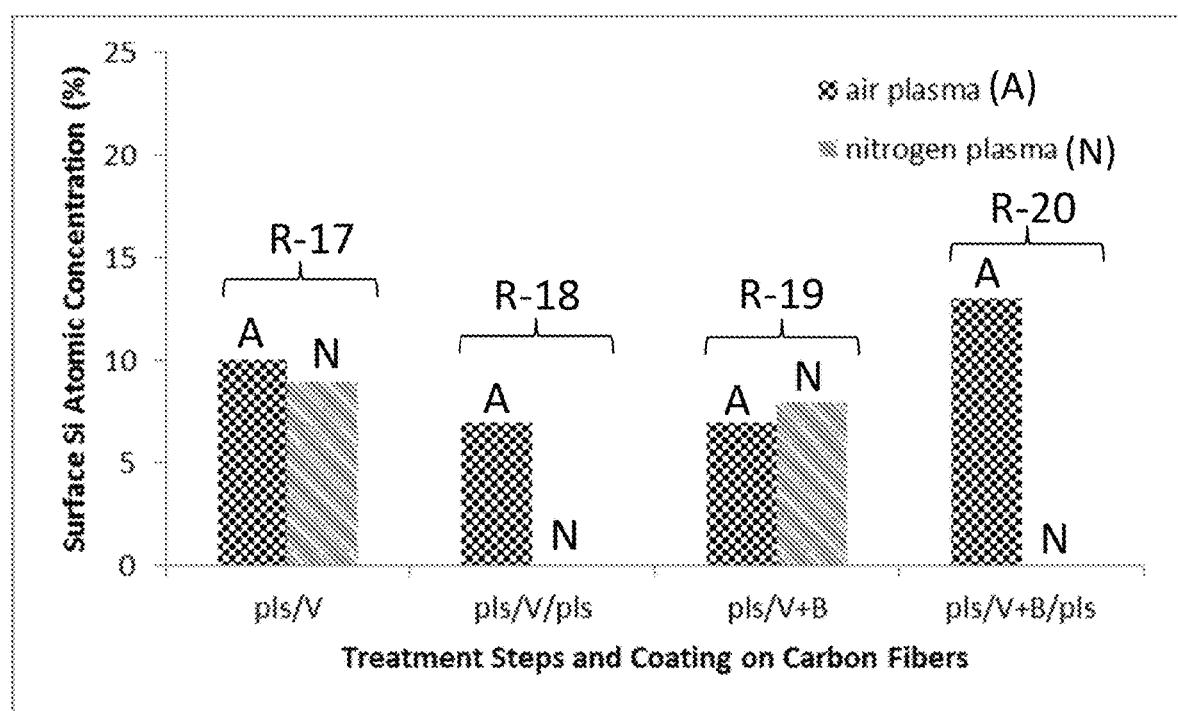
FIG. 5 is a graphical representation of the surface silicon content measured for treated carbon fibers.

The fiber surfaces were tested using X-Ray Photoelectron Spectroscopy (XPS) to observe the surface chemical content. The processing conditions included plasma followed by VTES application (pls/V, R-13, R-17), plasma followed by application of a mixture of VTES and BTMSH (pls/V+B, R-14, R-18), plasma followed by VTES and plasma post-exposure (pls/V/pls, R-15, R-19), and plasma followed by application of a mixture of VTES and BTMSH and plasma post-exposure (pls/V+B/pls, R-16, R-20). In FIG. 4 a graph comparing the treatment steps, coating types, and plasma gas (A=air; N=nitrogen) for the treated BioMid™ fibers (R-13 to R-16) is provided. In FIG. 5 a similar comparison for treated carbon fibers (R-17 to R-20) is provided.

The XPS data measured for the BioMid™ fibers (R-13 to R-16 in FIG. 4) shows that increased surface silicon content was produced from air plasma (A) over nitrogen (N), pure VTES (R-13) over the mixture of VTES with BTMSH (R-15), as well as the post-plasma treatment step (compare R-14 versus R-16). The highest surface silicon content observed was 20% with air plasma, VTES coating, and plasma post-exposure (R-14). The XPS data measured for carbon fibers (R-17 to R-20 in FIG. 5) showed mixed effects with the highest surface silicon content being observed was 13% with air plasma, a mixture of VTES and BTMSH coating, and plasma post-exposure (R-20).

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of manufacturing one or more coated natural fibers, the method consisting of the following steps performed in sequential order in a continuous process one or more times:
    providing at least one fiber having a surface, the at least one fiber does not comprise a synthetic fiber, the at least one fiber having a composition selected from the group consisting of flax, wood, jute, kenaf, hemp, cotton, coir, bamboo, abaca, ramie, sisal, silk, wool, camel hair, angora, alpaca fiber, mohair, and a blend thereof;
    optionally, pretreating the surface of the at least one fiber using atmospheric pressure plasma; and
    applying a coating formulation consisting essentially of a silane coupling agent or an organosilicon compound in the form of a pure chemical, a mixture, a solution, or a dispersion directly to the surface of the at least one fiber along with simultaneously exposing the coating formulation on the surface of the at least one fiber to an atmospheric pressure plasma, thereby, bonding and curing the coating formulation on the surface of the at least one fiber to form the one or more coated natural fibers without the need for a photoinitiator.

2. The method according to claim 1, wherein the atmospheric pressure plasma is generated using one selected from the group consisting of corona, dielectric barrier discharge, microwave, atmospheric plasma jets, and hollow cathode.

3. The method according to claim 1, wherein the atmospheric pressure plasma is generated using a plasma source powered by a generator providing continuous direct current (DC), pulsed DC current, or alternating current in a frequency ranging from radio frequency (RF) to microwave frequency.

4. The method according to claim 1, wherein the atmospheric pressure plasma is generated using a source gas, the source gas being selected from the group consisting of air, nitrogen, helium, argon, oxygen, hydrogen, carbon dioxide, nitrous oxide, and mixtures thereof; optionally, the source gas includes an organic, inorganic, organosilicon, metal oxide precursor or mixture thereof that can form a solid film.

5. The method according to claim 1, wherein the surface of the at least one fiber is pretreated using atmospheric pressure plasma.

6. The method according to claim 1, wherein the at least one fiber is a thread, strand, yarn, or filament.

7. The method according to claim 1, wherein the coating formulation is applied to at least one fiber using a or spray coating process.

8. The method according to claim 7, wherein the at least one fiber is fed continuously through the coating process.

9. The method according to claim 1, wherein the steps of the method are performed more than one time forming a multilayer coating on the fiber.

10. The method according to claim 9, wherein each of the steps of claim 1 are repeated using one or more coated fibers to replace the at least one fiber having the surface until a desired number of coating layers is applied to the one or more coated fibers.

* * * * *